United States Patent
Newcombe

[11] 3,899,463
[45] Aug. 12, 1975

[54] FLAME-RETARDANT COMPOSITION

[75] Inventor: Jack Newcombe, Freehold, N.J.

[73] Assignee: Cities Service Company, Tulsa, Okla.

[22] Filed: Oct. 3, 1973

[21] Appl. No.: 402,960

Related U.S. Application Data

[60] Division of Ser. No. 281,692, Aug. 18, 1972, which is a continuation-in-part of Ser. No. 115,081, Feb. 12, 1971, abandoned.

[52] U.S. Cl.......... 260/45.7 R; 106/15 FP; 117/137; 260/45.75 B
[51] Int. Cl............. C08f 45/58; C08g 51/58
[58] Field of Search .............. 260/45.75 B, 45.7 R

[56] References Cited
UNITED STATES PATENTS

| | | | |
|---|---|---|---|
| 3,050,567 | 8/1962 | Schmerling | 260/648 |
| 3,365,505 | 1/1968 | Norell | 260/45.75 |
| 3,396,201 | 8/1968 | Weil et al. | 260/648 |
| 3,403,036 | 9/1968 | Hindersinn et al. | 260/45.75 |
| 3,697,607 | 10/1972 | Cardenas | 260/45.7 |

*Primary Examiner*—V. P. Hoke
*Attorney, Agent, or Firm*—Patricia J. Hogan

[57] ABSTRACT

A normally flammable organic polymer is rendered flame retardant by the incorporation of a compound corresponding to the formula:

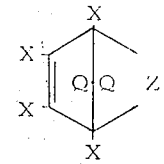

wherein X is chloro or bromo, Q is halo, hydrogen, or a hydrocarbyl or hydrocarbyloxy group, and Z is a divalent saturated polybromocycloalkylene group containing 5–16 carbon atoms and 2–6 bromine atoms. Such flame retardants include, e.g., 5,6-dibromo-1,10,11,12,13,13-hexachlorotricyclo[8.2.1.0$^{2,9}$]tridecene-11, i.e., the dibrominated 1:1 Diels-Alder adduct of hexachlorocyclopentadiene and cyclooctadiene-1,5. If desired, the flame retardant may be employed in conjunction with a synergist, such as antimony trioxide.

1 Claim, No Drawings

FLAME-RETARDANT COMPOSITION

CROSS-REFERENCE TO RELATED APPLICATION

This is division, of application Ser. No. 281,692, filed Aug. 18, 1972, which in turn is a continuation-in-part of application Ser. No. 115,081, filed Feb. 12, 1971, now abandoned.

BACKGROUND OF THE INVENTION

1. Field of the Invention

This invention relates to flame-retardant compositions and more particularly relates to such compositions comprising normally flammable organic polymers and novel halogenated organic flame retardants.

2. Description of the Prior Art

It is known that halogenated compounds are sometimes useful for imparting flame retardancy to normally flammable organic polymers. However, the halogenated compounds which have been proposed for use as flame retardants usually have one or more of the following disadvantages: volatility, instability at processing temperatures, incompatibility, inefficiency, and toxicity.

If the halogenated compound is too volatile, it does not remain in the polymer to function as a flame retardant when needed. If it is unstable at processing temperatures, it decomposes to cause corrosion of the equipment and discoloration of the polymer. If it is incompatible with the polymer, it exudes to the surface to form an esthetically unpleasing deposit, the removal of which results in removing the flame retardancy which the compound was supposed to impart. If it is inefficient, it must be used in such high concentrations that it has an unduly deleterious effect on polymer properties and unduly increases the cost of the fabricated polymer. If it is toxic, it presents more-or-less serious hazards to the health and/or life of fabricators and users of the flame-retardant composition in which it is used and also presents an ecological problem when the fabricated polymer is discarded.

Since some of these disadvantages make a compound less than desirable for use as a flame retardant, and others actually prevent it from having any practical utility as a flame retardant, it is apparent that there is a need for a flame retardant which is substantially nonvolatile, stable at processing temperatures, compatible, efficient, and non-toxic.

It is believed that the general lack of success of the prior art in producing such a flame retardant is at least partially due to the tendency of a given factor to degrade at least one of these properties while improving another. For instance, it has been found that compounds containing cycloaliphatic bromine are sometimes more efficient than other halogenated compounds, but these compounds have poor stability at processing temperatures and frequently have other disadvantages, such as volatility, incompatibility, and toxicity. Compounds containing vinylic bromine on the ring carbon atoms are more stable but less efficient, and they may also be too volatile, toxic, and incompatible.

It might be thought that the toxicity of halogenated compounds could be reduced by decreasing their halogen contents, but this has not been found to be the case. Comparison of halogenated insecticides having similar structures indicates that toxicity does not simply increase with an increase in halogen content and, in fact, may even decrease with an increase in halogen content. For instance, the hexachlorocyclopentadiene adduct Aldrin, with six chlorine atoms, has a halogen content of about 58 percent and an $LD_{50}$ number of 55; the hexachlorocyclopentadiene adduct Heptachlor, with seven chlorine atoms, has a halogen content of about 66 percent and an $LD_{50}$ number of 130–135; the hexachlorocyclopentadiene adduct Chlordane, with eight chlorine atoms, has a halogen content of about 69 percent and an $LD_{50}$ number of 570.

SUMMARY OF THE INVENTION

An object of this invention is to provide novel flame-retardant organic polymer compositions.

Another object is to provide such compositions containing a flame retardant which has practical utility.

A further object is to provide such compositions wherein the flame retardant is substantially non-volatile, stable at processing temperatures, compatible, efficient, and non-toxic.

These and other objects are attained by intimately mixing a normally flammable organic polymer with a flame retardant corresponding to the formula:

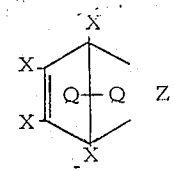

wherein X is chloro or bromo, Q is halo, hydrogen, or a hydrocarbyl or hydrocarbyloxy group, and Z is a divalent saturated polybromocycloalkylene group containing 5–16 carbon atoms and 2–6 bromine atoms; said valences being on adjacent carbon atoms.

DESCRIPTION OF THE PREFERRED EMBODIMENTS

The normally flammable organic polymer which is rendered flame retardant in accordance with the invention may be natural or synthetic but is preferably a solid synthetic polymer, more preferably a polymer of an unsaturated hydrocarbon. Exemplary of the polymers are cotton, wool, silk, paper, natural rubber, wood, paint, the high molecular weight homopolymers and copolymers of unsaturated aliphatic and aromatic hydrocarbons (e.g., ethylene, propylene, styrene, etc.), acrylic polymers (e.g., polyacrylonitrile, polymethyl methacrylate, etc.), alkyd resins, cellulose derivatives (e.g., cellulose acetate, methyl cellulose, etc.), epoxy resins, furan resins, isocyanate resins (e.g., polyurethanes), melamine resins, vinyl resins (e.g., polyvinyl acetate, polyvinyl chloride, etc.), resorcinol resins, synthetic rubbers (e.g., polyisoprene, polybutadiene, butadiene-acrylonitrile copolymers, butadiene-styrene copolymers, butyl rubber, neoprene rubber, etc.), ABS resins, and mixtures thereof.

The flame retardant of the invention may be any compound corresponding to the above formula. Such compounds are already known and may be prepared by reacting a polyhalocyclopentadiene with a suitable multi-unsaturated cycloaliphatic hydrocarbon to form a 1:1 Diels-Alder adduct, and then adding bromine to the residual unsaturation. If desired, additional bromine may be introduced by substitution bromination.

Alternatively, the bromine may be introduced by starting with an unsaturated cycloaliphatic bromide. It is important that the polybromocycloalkylene group in the flame retardant be saturated, because the presence of residual unsaturation would decrease the efficiency of the compound as a flame retardant.

Polyhalocyclopentadienes suitable for use in preparing the flame retardants of the invention include hexachlorocyclopentadiene, hexabromocyclopentadiene, 5,5-dimethoxytetrachlorocyclopentadiene, 5,5-diethoxytetrachlorocyclopentadiene, 5,5-dihydrotetrachlorocyclopentadiene, 5,5-difluorotetrachlorocyclopentadiene, 5,5-dibromotetrachlorocyclopentadiene, etc. The polyhalocyclopentadienes containing at least two chlorine atoms are preferred, because the flame retardants prepared therefrom appear to have improved dispersibility in many organic polymers.

Multi-unsaturated cycloaliphatic hydrocarbons suitable for use in preparing the flame retardants of the invention include cyclopentadiene, bicycloheptadiene, 4-vinylcyclohexene, divinylcyclohexane, cyclooctadiene-1,3, cyclooctadiene-1,5, dicyclopentadiene, cyclodecadiene-1,5, trivinylcyclohexane, cycloheptatriene-1,3,6, cyclododecatriene-1,5,9, trimethylcyclododecatriene-1,5,9, bis(cyclohexenyl)ethylene, cyclooctatetraene, cyclohexadecatetraene-1,5,9,13, etc.

The preferred flame retardants of the invention are those wherein X and Q of the formula are chloro, the bromine atoms of the polybromocycloalkylene group are paired in vicinal positions, the polybromocycloalkylene group contains 2–4 (most preferably two) bromine atoms, at least some (most preferably all) of the bromine atoms of the polybromocycloalkylene group are substituents on cycloaliphatic carbon atoms, and/or the polybromocycloalkylene group is monocyclic and contains 8-12 carbon atoms in the ring. A particularly preferred flame retardant is 5,6-dibromo-1,10,11,12,13,13hexachlorotricyclo[8.2.1.0$^{2,9}$]-tridecene-11, i.e., the dibrominated 1:1 Diels-Alder adduct of hexachlorocyclopentadiene and cyclooctadiene-1,5, which has the following structural formula:

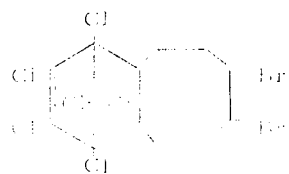

The organic polymer is intimately mixed with the flame retardant and any optional additives, such as fillers, pigments, plasticizers, stabilizers, synergists, etc., in any suitable manner (e.g., by the use of an extruder, a two-roll mill, or a Banbury mixer) to provide a composition containing about 1–25 percent, preferably about 4–20 percent, by weight of flame retardant, based on the combined weights of organic polymer and flame retardant.

Although the flame retardants of the invention are fairly efficient, it is frequently desirable to enhance their effectiveness by including one or more of the compounds of antimony, arsenic, or bismuth, which are well known synergists for halogenated flame retardants. Antimony trioxide is particularly useful in this regard. When such a synergist is employed, it is usually used in an amount such as to provide a flame retardant/synergist weight ratio of about 1–4.5/1, preferably about 2/1.

The flame retardants of the invention are particularly advantageous in that they are colorless, odorless, relatively insensitive to environmental conditions, non-toxic, substantially non-volatile, compatible with polymers, surprisingly stable at processing temperatures, and efficient. The fact that they are effective at low concentrations makes it possible for them to be used to prepare flame-retardant polymer compositions which retain the desirable physical properties of the pure polymer to a remarkable extent, and it facilitates polymer coloring and permits the preparation of flame retardant concentrates.

The following examples are given to illustrate the invention and are not intended as a limitation thereof. Unless otherwise specified, quantities mentioned are quantities by weight. The oxygen indices of the base polymers used in the examples are: polypropylene 18.0, polyethylene - 17.9, ABS - 19.5. The flame retardants used in the examples and their melting points are:

| Designation | Formula | M.P. (°C.) |
|---|---|---|
| FR-3 | (structure) | |
| FR-4 | (structure) | 154-157 |
| FR-5 | (structure) | 98-140 |
| FR-6 | (structure) | 242-246 |
| FR-7 | (structure) | 127-129 |
| FR-8 | (structure) | — |

EXAMPLE I - CONTROL

Blend polypropylene with an amount of a 2:1 mixture of Control A and antimony trioxide sufficient to form a composition having an oxygen index of 26.5. Forty parts of the mixture are required.

EXAMPLE II

Repeat Example I except for substituting FR-1 for Control A. Only 7.5 parts of the mixture are required, and tests show that the flame-retardant polymer retains the desirable physical properties of the base polymer to an extraordinary extent.

EXAMPLE III - CONTROL

Blend polypropylene with an amount of a 2:1 mixture of Control B and antimony trioxide such as to provide a bromine content of 1.5 percent in the blend. Injection mold test specimens at 425°F.

The test specimens have an oxygen index of only 24.5 and a tan exudate on their surfaces. This shows that the flame retardant is both unstable at processing temperatures and incompatible with polypropylene.

EXAMPLE IV

Repeat Example III except for substituting FR-1 for Control B. The test specimens have an oxygen index of 26.5 and a translucent white appearance. This shows that the flame retardant is both stable at processing temperatures and compatible with polypropylene.

EXAMPLE V

Blend polypropylene with an amount of FR-1 such as to provide a bromine content of about 1.3 percent in the blend. The blend has an oxygen index of 21.0.

EXAMPLE VI

Prepare six compositions by repeating Example V except for also blending with various amounts of antimony trioxide. The ratios of FR-1 to antimony trioxide in the blends and the resultant oxygen indices are shown in Table I.

TABLE I

| FR-1/$Sb_2O_3$ | Oxygen Index |
|---|---|
| 1.0 | 25.6 |
| 1.5 | 26.3 |
| 2.0 | 26.3 |
| 3.0 | 26.3 |
| 4.0 | 26.3 |
| 4.5 | 25.7 |

EXAMPLE VII

Prepare six compositions by blending polypropylene with various amounts of a 2:1 mixture of FR-1 and antimony trioxide. Mold test specimens from the blends and test for oxygen index. The amounts of flame retardant mixture employed and the resultant oxygen indices are shown in Table II.

TABLE II

| % FR Mixture | Oxygen Index |
|---|---|
| 1.5 | 22.0 |
| 4.5 | 24.8 |
| 5.2 | 25.5 |
| 6.0 | 26.0 |
| 7.5 | 26.5 |
| 13.5 | 26.5 |

EXAMPLE VIII

Prepare seven compositions by blending polypropylene with 2:1 mixtures of various flame retardants and antimony trioxide so as to provide bromine contents of 3 percent. The flame retardants employed and the oxygen indices obtained by tests on injection molded samples are shown in Table III.

TABLE III

| Flame Retardant | Oxygen Index |
|---|---|
| FR-2 | 26.8 |
| FR-3 | 26.8 |
| FR-4 | 26.2 |
| FR-5 | 26.8 |
| FR-6 | 25.5 |
| FR-7 | 24.7 |
| FR-8 | 24.5 |

EXAMPLE IX

Blend low density polyethylene with an amount of a 2:1 mixture of FR-1 and antimony trioxide such as to provide a bromine content of about 2.2 percent in the blend. The oxygen index is 24.5.

EXAMPLE X

Blend 15 parts of a 2:1 mixture of FR-1 and antimony trioxide with 85 parts of an impact polystyrene which has been prepared by the mass polymerization of styrene in the presence of polybutadiene and which has a rubber content of about 5 percent. Test specimens of the blend have an oxygen index of 25.9.

EXAMPLE XI

Repeat Example X except for replacing the impact polystyrene with an ABS resin which has been prepared by the emulsion polymerization of a 70:30 mixture of styrene and acrylonitrile in the presence of a polybutadiene rubber and which has a rubber content of about 20 percent. The oxygen index is 30.5.

It is obvious that many variations may be made in the products and processes set forth above without departing from the spirit and scope of this invention.

What is claimed is:

1. A composition comprising a normally flammable organic polymer and a flame retardant corresponding to the formula:

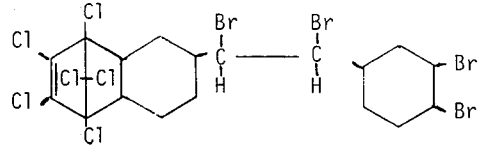

said flame retardant being present in an amount of from 1 to 25 percent based upon the combined weights of the organic polymer and flame retardant.

* * * * *

UNITED STATES PATENT OFFICE
CERTIFICATE OF CORRECTION

Patent No. 3899463          Dated August 12, 1975

Inventor(s) Jack Newcombe

It is certified that error appears in the above-identified patent and that said Letters Patent are hereby corrected as shown below:

Column 4, lines 1-7, the illegible formula should read --

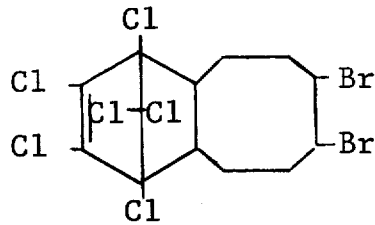

Column 4, lines 46-70, should read --

| Designation | Formula | M.P. (°C.) |
|---|---|---|
| Control A | 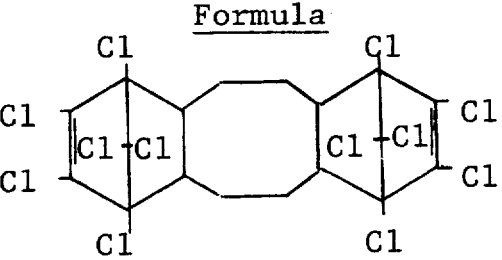 | >350 |
| Control B | 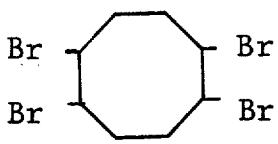 | 105-112 |

UNITED STATES PATENT OFFICE
CERTIFICATE OF CORRECTION

Patent No. 3899463  Dated August 12, 1975

Inventor(s) Jack Newcombe

It is certified that error appears in the above-identified patent and that said Letters Patent are hereby corrected as shown below:

FR-1 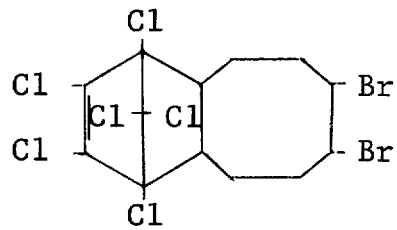 201

FR-2 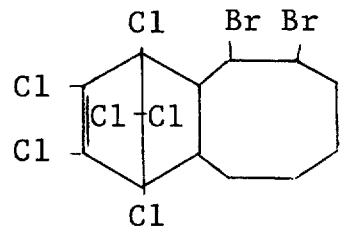 ---

Column 5, lines 1-43, should read --

FR-3 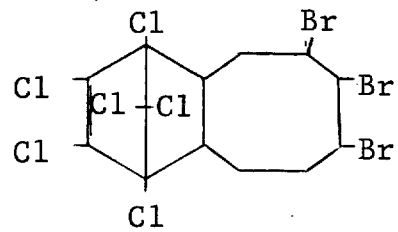 134-142

FR-4 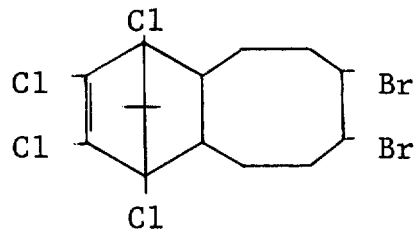 154-157

Page 2 of 3

PO-1050
(5/69)

UNITED STATES PATENT OFFICE
CERTIFICATE OF CORRECTION

Patent No. 3899463      Dated August 12, 1975

Inventor(s) Jack Newcombe      Page 3

It is certified that error appears in the above-identified patent and that said Letters Patent are hereby corrected as shown below:

FR-5 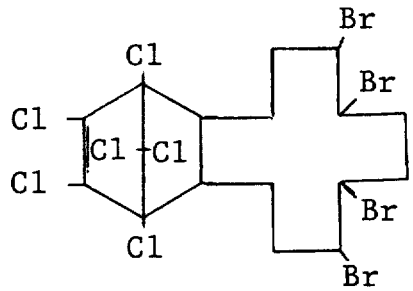 98-140

FR-6 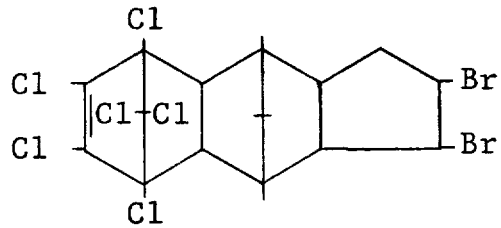 242-246

FR-7 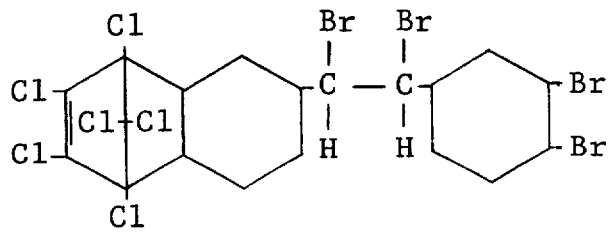 127-129

FR-8 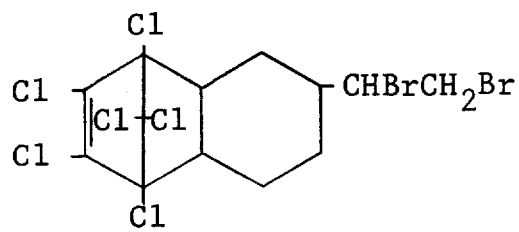 ---

Signed and Sealed this twenty-eight Day of October 1975

[SEAL]

Attest:

RUTH C. MASON      C. MARSHALL DANN
*Attesting Officer*      *Commissioner of Patents and Trademarks*